United States Patent
Yang et al.

(10) Patent No.: US 7,904,351 B2
(45) Date of Patent: Mar. 8, 2011

(54) INVENTORY TRACKING MECHANISM FOR VIRTUAL WAFER CIRCUIT PROBING SUBCONTRACT

(75) Inventors: Chia Ho Yang, Hsinchu (TW); Ming Ta Hsu, Jhubei (TW); Shau Tsung Yu, Taipei (TW); Su Mei Chang, Taipei (TW); Tien Hui Chang, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1603 days.

(21) Appl. No.: 10/853,913

(22) Filed: May 26, 2004

(65) Prior Publication Data

US 2006/0010039 A1    Jan. 12, 2006

(51) Int. Cl.
*G06Q 10/00* (2006.01)
(52) U.S. Cl. .................................................. 705/28
(58) Field of Classification Search .................... 705/28
See application file for complete search history.

(56) References Cited

U.S. PATENT DOCUMENTS

| | | | | |
|---|---|---|---|---|
| 7,308,416 B2* | 12/2007 | Peachey-Kountz et al. | ..... | 705/8 |
| 7,444,295 B2* | 10/2008 | Peachey-Kountz et al. | ..... | 705/8 |
| 2003/0171968 A1* | 9/2003 | Yamada et al. | ..... | 705/8 |
| 2003/0233290 A1* | 12/2003 | Yang et al. | ..... | 705/28 |
| 2005/0177526 A1* | 8/2005 | Lin et al. | ..... | 705/400 |

* cited by examiner

*Primary Examiner* — F. Ryan Zeender
*Assistant Examiner* — Paul Danneman
(74) *Attorney, Agent, or Firm* — Haynes and Boone, LLP

(57) ABSTRACT

The present disclosure provides an inventory tracking method for use with semiconductor product. The method can be used to track wafer lots transferred from a front end such as a fabrication (fab) facility, to a back end such as a wafer circuit probe facility. The method includes tracking a lot of wafers being sent to the back end facility and receiving a status report from the back end facility. The status report is compared to a predetermined criteria, and the lot is designated as a first type, such as slow moving, if the status report fails to meet the predetermined criteria. A payment plan is then associated with the lot due to it being designated as slow moving.

18 Claims, 5 Drawing Sheets

INVENTORY TRACKING MECHANISM FOR VIRTUAL WAFER CIRCUIT PROBING SUBCONTRACT

FIELD OF DISCLOSURE

The present disclosure relates generally to semiconductor manufacturing entities such as wafer fabrication facilities and circuit probing facilities, more particularly, to a method and system for facilitating invoicing and payment between entities in a semiconductor manufacturing environment.

BACKGROUND

The semiconductor business has gone through many recent changes. One of the changes is that a chip provider may not be the same entity that manufactures the chip. For example, a first entity can come up with a chip design, a second entity can produce a mask set for the design, a third entity can fabricate wafers on which the chips (referred to as die) are located, a fourth entity can test the die on the wafer (referred to as circuit probe), a fifth entity can perform assembly, a sixth entity can perform final test, and a seventh entity can market and/or sell the final chips. Any of these entities can be a customer to the other, and a single entity (e.g., the one who markets and/or sells the final chips) may be a customer to all of the entities.

It is important to properly allocate costs among all the entities involved in manufacturing the chips. For example, when a front end such as wafer fabrication facility (fab) ships product to a back end such as a wafer circuit probe facility, there is an opportunity to bill the customer at that time. In a quote-by-wafer (QBW) scenario, the fab will invoice the customer when the wafers are shipped to the wafer circuit probe. In this scenario, the customer purchases wafers, independent of circuit probe yield. If there are defective wafers (e.g., a wafer fails to meet a predetermined yield), the fab can then refund the customer some or all of the payment. For example, the refund may be prorated according to the wafer yield. In a quote-by-die (QBD) scenario, the fab ships the wafers to wafer circuit probe, but holds off on billing the customer. The probe yield is then reported to the fab, and the fab invoices the customer for the good die.

There are many problems associated with the above-described scenarios. For example, handling refunds is difficult and cost-ineffective. Also, in QBD scenarios, billing is often delayed for longer-than-expected time periods. Accordingly, what is needed is a system and method that addresses one or more of these problems. Additionally and/or alternatively, what is needed is a system and method that can be used in such a manufacturing environment.

DETAILED DESCRIPTION

Figure 1:
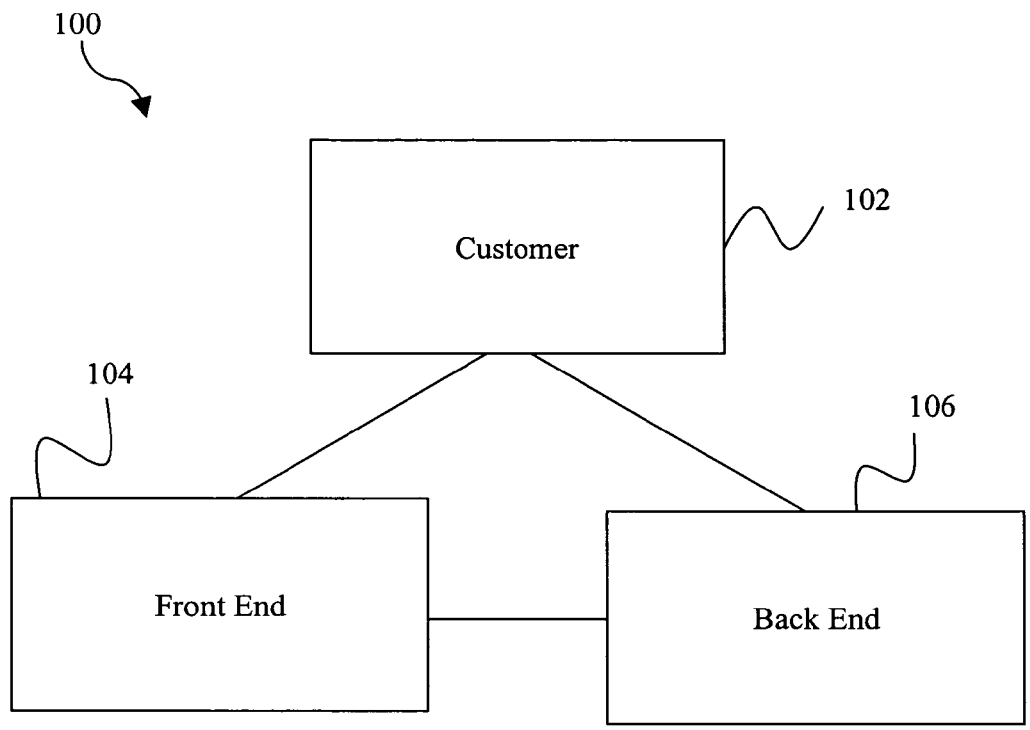
FIG. 1 is a block diagram of a front end, a back end, and a customer in a business environment that can benefit from one or more embodiments of the present invention.

It is to be understood that the following disclosure provides many different examples for implementing different embodiments of the present invention. Also, specific examples of components and arrangements of components are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the relationship of a first entity with a second entity in the description that follows may include embodiments in which the first and second entities are in direct communication, and may also include embodiments in which additional entities may be interposed between the first and second entities, such that the first and second entity may not be in direct communication.

Referring to FIG. 1, a semiconductor business system 100 can benefit from one or more embodiments of the present invention. According to one embodiment, the system 100 includes a customer 102, a front end 104, and a back end 106. In the present embodiment, the front and back end indicate facilities used in the manufacture of semiconductor integrated circuits. As a further example, the front end 104 is a first process, such as a fabrication facility (fab), and the back end 106 is a second process, such as a wafer circuit probe facility. In continuance of the example, the customer 102 has employed the front end 104 to fabricate one or more semiconductor wafers, and has employed the back end to test the wafers.

It is understood that there are other examples that can also benefit from the present invention. The front end 104 can be a circuit design house and the back end 106 can be a fab that also performs wafer circuit probe. In yet another example, the front end 104 can be a circuit probe facility and the back end 106 can be an assembly facility and/or a final test facility. Additional examples also exist outside of the semiconductor manufacturing environment.

Figure 2:
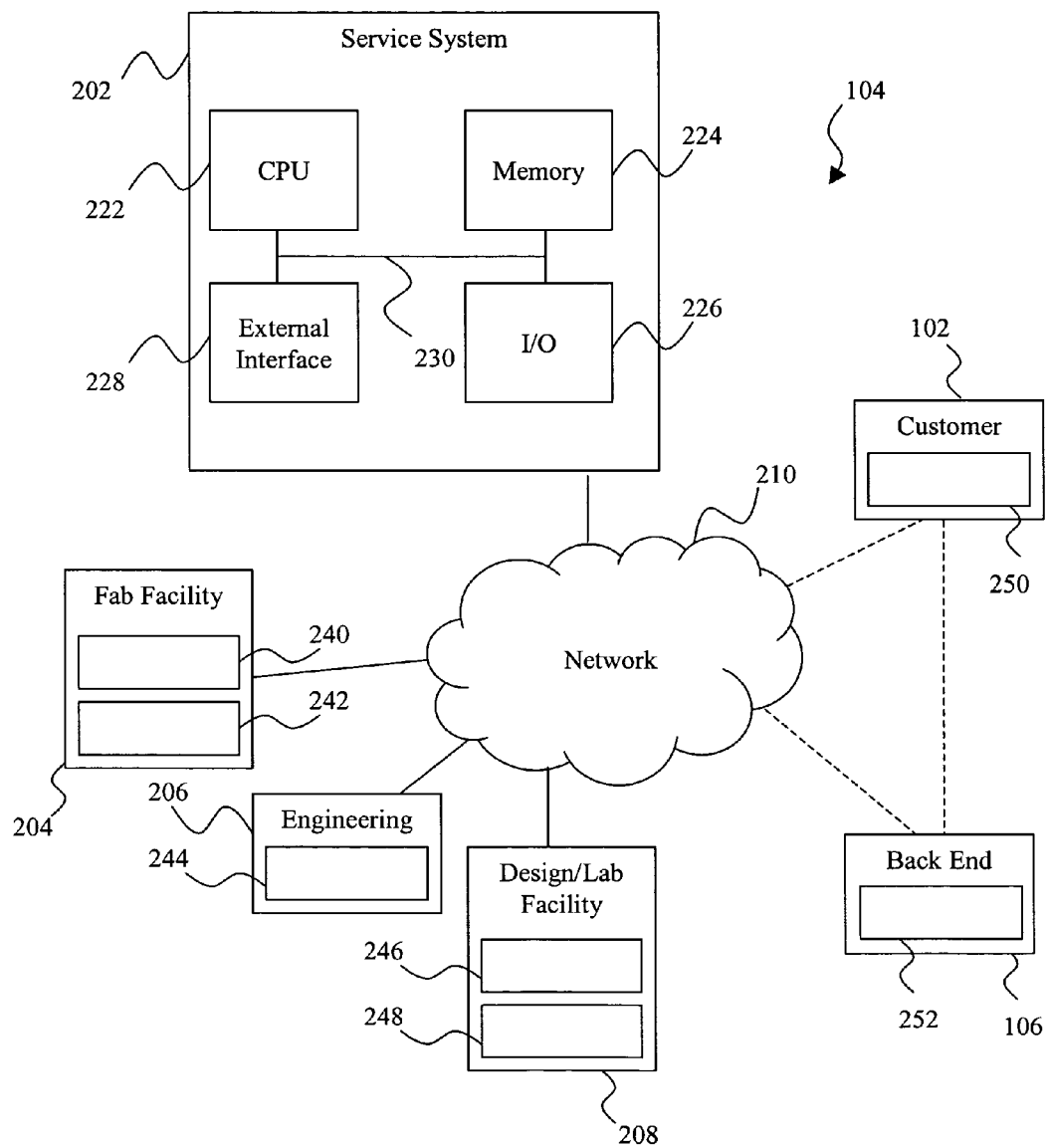
FIG. 2 is an expanded schematic view of the environment of FIG. 1, with additional details and examples of different embodiments.

Referring now to FIG. 2, in continuation of the first example discussed above, the front end 102 includes a plurality of entities. The entities include one or more internal entities such as a service system 202, the actual fab equipment 204, and/or an engineering system 206, and may also include an external entity such as a design facility or lab 208. One or more of the entities 202-208 may be interconnected by a communications network 210. The network 210 may be a single network or may be a variety of different networks, such as an intranet and the Internet, and may include both wireline and wireless communication channels. The connections can use digital communications such as internet protocol, analog communications such as traditional telephone dial-up communications, or combinations thereof.

Each of the entities 202-208 may include one or more computing devices such as personal computers, personal digital assistants, pagers, cellular telephones, and the like. For the sake of example, the service system 202 is expanded to show a central processing unit (CPU) 222, a memory unit 224, an input/output (I/O) device 226, and an external interface 228. The external interface may be, for example, a modem, a wireless transceiver, and/or one or more network interface cards (NICs). The external interface may also include a browser software so that one interface can be made to the customer 102 and a separate interface can be made to the back end 106, using essentially the same hardware but different software instances.

The components 222-228 are interconnected by a bus system 230. It is understood that the service system 202 may be differently configured and that each of the listed components may actually represent several different components. For example, the CPU 222 may actually represent a multi-processor or a distributed processing system; the memory unit 224 may include different levels of cache memory, main memory, hard disks, and remote storage locations; and the I/O device 226 may include monitors, keyboards, and the like.

The fab facility 204 includes one or more computing devices 240, 242. These computing devices can be attached to equipment that performs processing operations, or may be adjunct systems used by the fab in general. The engineering entity 206 includes one or more computing devices 244. The design/lab facility 208 also includes one or more computing devices 246, 248.

It is also understood that the customer 102 may include one or more computing devices 250 and the back end 106 may include one or more computing devices 252. It is further anticipated that the communications internal to the front end 104 may be of one type, and the communications between the front end and the customer 102 and/or the back end 106 may be of another type, and may utilize different networks altogether.

Figure 3:
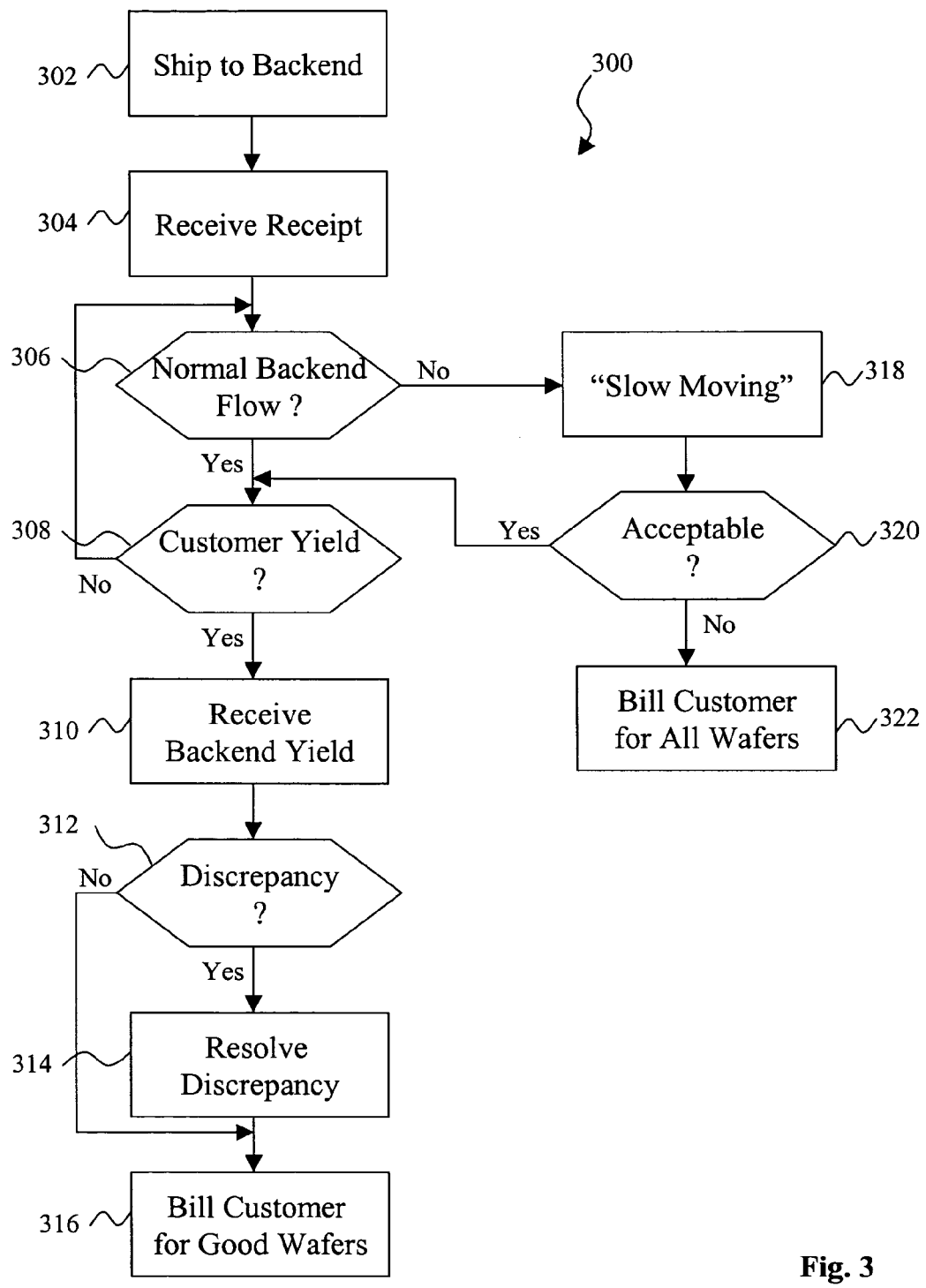
FIG. 3 is a flow chart of a method for implementing an inventory tracking routine according to one or more embodiments of the present invention.

Referring now to FIG. 3, the service system 202 (FIG. 2) can perform a method 300 for inventory tracking and billing the customer 102 for wafers processed by the front end 104 and back end 106. It is understood that the method 300 can also or alternatively be performed by either the customer 102 or the backend 106, and/or may have functionality distributed therebetween. In the present embodiment, the method 300 provides a modification to the quote-by-die (QBD) method of billing that provides some of the benefits normally associated with the quote-by-wafer (QBW) method of billing.

Execution begins at step 302 where a shipment is made to the back end 106. In the present example, the shipment will include one or more "lots," each lot including one or more wafers. In the present embodiment, the lots do not require further processing at the front end 104, although other embodiments may require that the lots be sent back to the front end after being processed at the back end 106.

At step 304, a "Receive Receipt" is received at the front end 104 indicating that the back end 106 has received the product in question. The Receive Receipt can be automatically delivered, for example, through the network 210 (FIG. 2) in a computer-to-computer communication between the back end 106 and the service system 202 of the front end 104.

At step 306, a determination is made as to whether each of the received lots is in a "normal" backend flow. A normal backend flow is one that produces expected results or information within an expected time frame. For example, it may be expected that the back end produce yield status reports within 4 weeks of receiving a wafer lot. Also, there may be several reports, such as an initial yield status report and a second report after additional testing. Initially, it can be assumed that a normal backend flow exists, although this may not always be the case.

At step 308, a determination is made as to whether a report has been provided for the lot. For example, in wafer probe, a yield would indicate the number of good die on each wafer. If no yield has been provided, execution returns to step 306. Otherwise execution proceeds to step 310 where the back end yield is provided by the customer 102 to the front end 104.

At step 312, a determination is made as to whether the report retrieved from the back end 106 (step 308) is consistent with a second report received from the customer (step 310). In the present example, the yield reported by the back end 106 should agree with a yield reported by the customer 102. If there is a discrepancy, it is resolved at step 314 either automatically (e.g., through a request for resubmission of data between the various computers) or manually (e.g., via an in-person telephone call or e-mail). At step 316, once any discrepancies have been resolved, the customer 102 is billed for the good die of each wafer lot by the front end 104.

Referring again to step 306, if it is determined that the back end flow is not normal, then execution proceeds to step 318. For example, a "slow moving" backend flow is one that is not being processed within an expected time frame. Another example is an "exceptional" lot that provides better-than-expected performance. Once a lot is designated as not normal, execution proceeds to step 320 where a determination is made as to whether this is acceptable. For example, instances where a slow moving lot may be acceptable include: the delay is marginal, the delay is associated with a predetermined cost penalty, or the back end is not the cause of the delay (e.g., new circuit design, new front end process flow).

If the delay at step 320 is acceptable, execution proceeds to step 308, as discussed above. If the delay is not acceptable, an alternative action is performed at step 322. For example, the billing process may then convert from QBD to QBW, so that the customer 102 is billed more quickly if the back end 106 is running slow.

Figure 4:
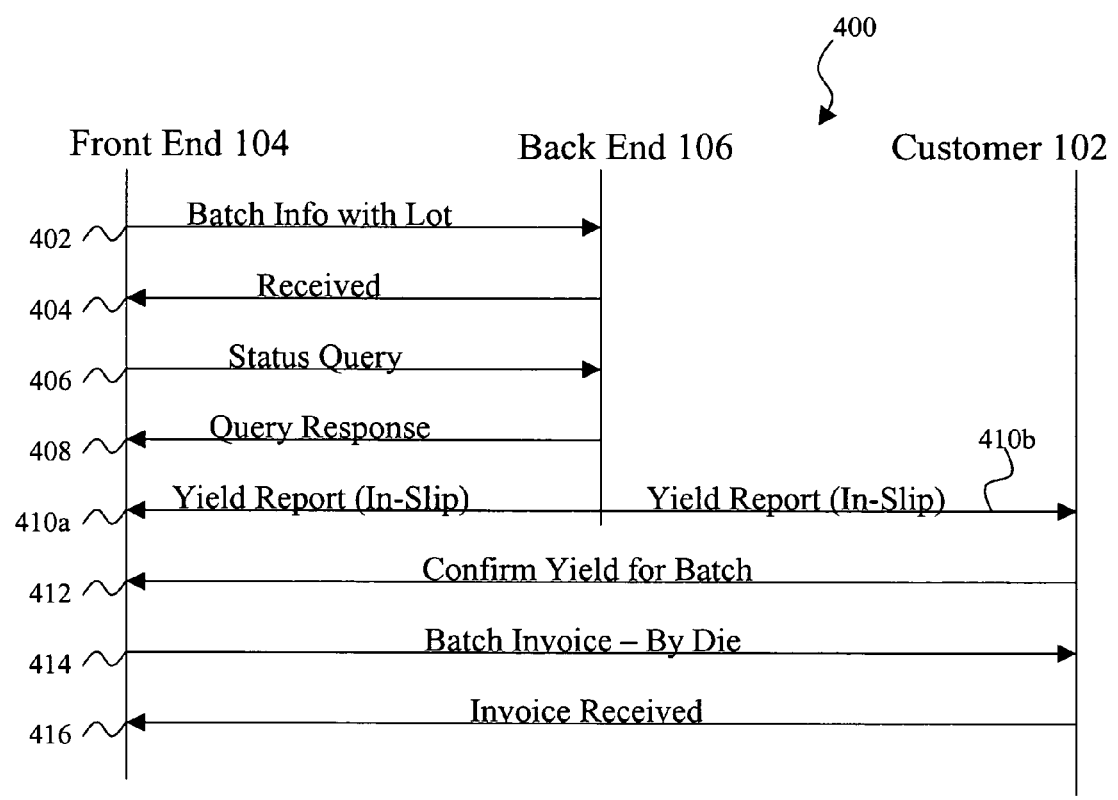
FIGS. 4 and 5 are message flow diagrams for implementing an inventory tracking routine according to one or more embodiments of the present invention.
Figure 5:
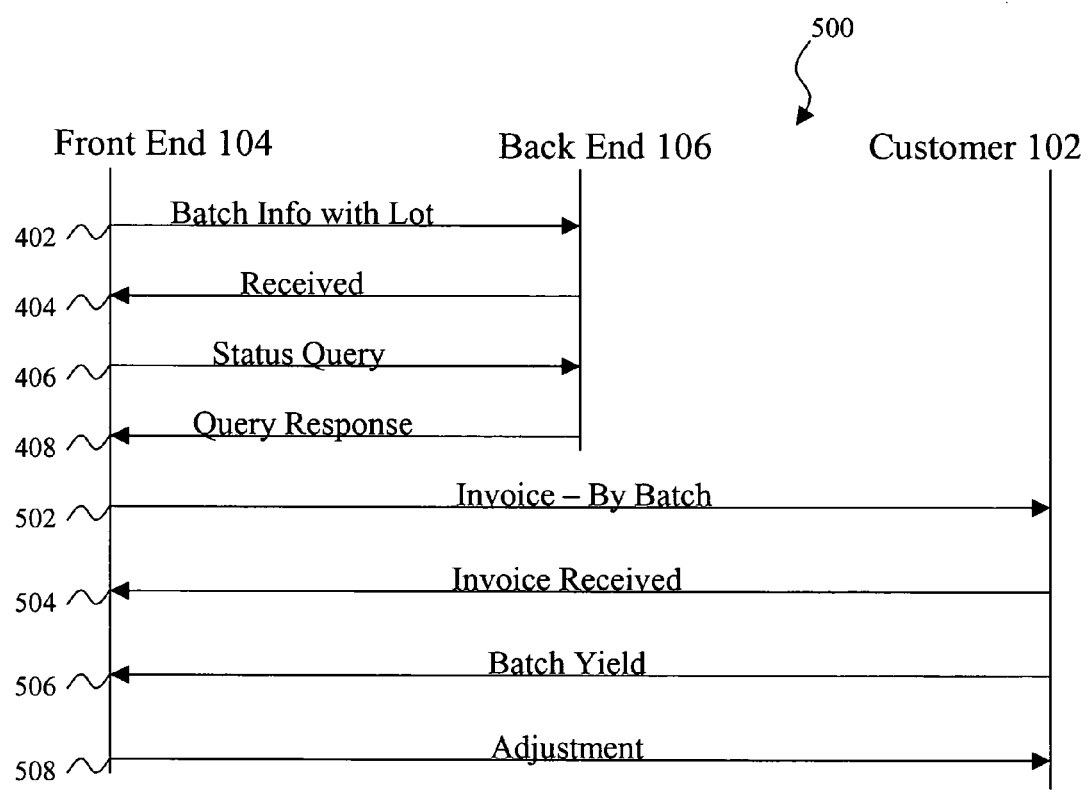

Referring now to FIGS. 4 and 5, message flow diagrams 400 and 500, respectively show different scenarios of how messages can be sent between the front end 104, the back end 106, and the customer 102. Referring specifically to FIG. 4, the message flow 400 begins when a message 402 including batch information is sent to the back end 106. The batch information includes detail information included with the batch of product (e.g., a batch can be one or more wafers or one or more lots) sent to the back end for further processing. A received message 404 is then returned, indicating that the batch message 402 and/or the product has been received.

Periodically, the front end 104 may send out a status query message 406 to the back end 106 to check on the status of the product. The back end responds to the query 406 with appropriate information. If the back end 106 does not respond, the front end 104 can notify the customer 102 accordingly. If the query response 408 indicates a certain category (e.g., the lot is slow moving), the front end 104 may take alternative action, such as will be discussed with reference to FIG. 5.

When the back end 106 is finished processing the lot(s), it sends a yield report (an in-slip) 410a, 410b to both the front end 104 and the customer 102. In alternative embodiments, the back end 106 may only send the in-slip to one of the two entities. The customer 102 can then examine and verify the in-slip 410b and send a confirmation yield report 412 to the front end 104. The front end 104 can then reconcile the in-slip 410a with the yield report 412. Once reconciled, the front end 104 can send an invoice 414 for all of the good die (according to the reconciliation). The customer 102 can then respond indicating that the invoice is received 416 and make payments accordingly.

Referring now to FIG. 5, the back end 106 responds to the query 406 with appropriate information. If the back end 106 does not respond, or if the query response 408 meets a certain category (e.g., the lot is slow moving), the front end 104 may take alternative action. In the scenario of message flow 500, the front end 104 sends the customer 102 an invoice 502 for the entire batch of wafers. The customer 102 can then reply 504 that the invoice has been received and make payments accordingly. If/when a yield is ever produced from the back end 106, the customer 102 can then send a batch yield report 506 (similar to message 412, FIG. 4) to the front end 104. The front end can then make an adjustment 508, such as a credit or refund to accommodate for the bad die.

The present disclosure has been described relative to a preferred embodiment. Improvements or modifications that become apparent to persons of ordinary skill in the art only after reading this disclosure are deemed within the spirit and scope of the application. For example, software polling operations are discussed, but an interrupt-based program can also be used. It is therefore understood that modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. An apparatus comprising a tangible computer-readable storage structure storing a computer program for tracking a semiconductor manufacturing inventory between multiple service providers, wherein the computer program, when executed, carries out:
    tracking a processing activity of the inventory that is carried out by a back end service provider, the inventory being provided to the back end service provider by a front end service provider;
    if the processing activity fails to meet a predetermined criteria, preparing a payment to the front end service provider based on a batch-type scenario; and
    if the processing activity meets the predetermined criteria, preparing a payment to the front end service provider based on an item-by-item scenario;
    wherein the predetermined criteria includes a determination of whether the processing activity is occurring at a rate that is slower than a predetermined rate.

2. The apparatus of claim 1 wherein the predetermined criteria is a yield report from the back end service provider.

3. The apparatus of claim 2 wherein the computer program, when executed, further carries out:
    comparing the yield report with a customer provided report; and
    if the comparison indicates a discrepancy, resolving the discrepancy before the preparing the payment based on the item-by-item scenario.

4. The apparatus of claim 1 wherein the inventory includes one or more wafers, wherein the processing activity is a functional test of one or more wafer die, and the predetermined criteria is a minimum yield for an entire wafer or group of wafers.

5. The apparatus of claim 4 wherein the batch-type scenario is a quote-by-wafer type billing scheme and the item-by-item scenario is a quote-by-die type billing scheme.

6. The apparatus of claim 1, wherein the predetermined criteria includes a back end handling delay, and wherein the computer program, when executed, further carries out the preparing each of the payments so that the payment based on the hatch-type scenario has an amount that is different from an amount of the payment based on the item-by-item scenario.

7. A computing system for implementing an inventory tracking routine at a front end service provider of a semiconductor manufacturing entity, the computing system comprising:
    a processing unit for processing data according to a set of instructions;
    a memory unit for storing the instructions;
    a first interface for communicating with a back end service provider;
    instructions stored in the memory unit for receiving a status report from the hack end through the first interface;
    instructions stored in the memory unit for comparing the status report to a predetermined criteria;
    instructions stored in the memory unit for managing payment of a first type if the status report fails to meet the predetermined criteria; and
    instructions stored in the memory unit for managing payment of a second type, different from the first type, if the status report meets the predetermined criteria;
    wherein the status report indicates whether a lot of wafers being processed at the back end is being processed at a slower rate than a predetermined rate.

8. The computing system of claim 7 wherein the first interface is adapted to receive data through a connection selected from the group consisting of an internet connection and a telephone network connection.

9. The computing system of claim 7 further comprising:
    a second interface for communicating with a customer, the customer being different from the back end;
    instructions stored in the memory unit for comparing the status report received through the first interface with a customer report received through the second interface; and
    instructions stored in the memory unit for resolving differences between the status report and the customer report.

10. The computing system of claim 7 wherein the status report is a wafer probe yield report and the predetermined criteria is a minimum acceptable yield.

11. The computing system of claim 7 wherein the instructions stored in the memory unit for managing payment of the second type effect generating an invoice for a customer using a quote-by-wafer scheme if the slower rate fails to meet the predetermined criteria.

12. An apparatus comprising a tangible computer-readable storage structure storing a computer program that, when executed, carries out:
    tracking a lot of wafers being sent to a back end facility;
    receiving a status report from the back end facility;
    comparing the status report to a predetermined criteria;
    designating the lot as a first type if the status report fails to meet the predetermined criteria and designating the lot as a second type if the status report meets the predetermined criteria;
    associating a wafer-based payment plan with the lot if designated as the first type; and
    associating a good-die-based payment plan with the lot if designated as the second type;
    wherein the status report is a wafer probe yield report and the predetermined criteria is a minimum acceptable yield.

13. The apparatus of claim 12 wherein the hack end facility is a wafer probe facility.

14. The apparatus of claim 12 wherein the computer program, when executed, further carries out:
    comparing the status report with a customer report received from a customer associated with the wafer lot; and
    resolving differences between the status report and the customer report.

15. The apparatus of claim 12 wherein the status report indicates whether a lot of wafers being processed at the back end is being processed at a slower rate than a predetermined rate.

16. The apparatus of claim 15, wherein the computer program, when executed, further carries out billing a customer for the lot if the status report indicates the lot of wafers being processed at the back end is being processed at the slower rate.

17. An apparatus comprising a tangible computer-readable storage structure storing a computer program that, when executed, carries out:

monitoring processing of an inventory, the inventory including semiconductor wafers that each have a plurality of dies, the inventory being provided to a first service provider by a second service provider;

calculating a handling delay of the inventory at the first service provider;

if the handling delay does not exceed a predetermined amount of time, billing a customer for the inventory after the processing is completed;

if the handling delay exceeds the predetermined amount of time, determining whether the delay is acceptable based on a factor that includes one of:

whether the inventory provides performance that is better than a benchmark performance;

whether the handling delay is within a predetermined timeframe;

whether the handling delay is associated with a predetermined cost penalty; and whether the first service provider is responsible for the delay;

if the handling delay is determined to be acceptable, billing the customer for the inventory after the processing is completed; and if the handling delay is determined to be unacceptable, billing the customer for the inventory before the processing is completed.

18. The apparatus of claim 17, wherein the computer program carries out each of the billing the customer so that:

if the customer is billed before the processing is completed, the customer is billed based on the total number of wafers in the inventory, a yield is calculated after the processing is completed, and a refund is calculated based on the yield; and if the customer is billed after the processing is completed, the customer is billed based on the total number of non-defective dies in the inventory.

* * * * *